United States Patent
Ackermann et al.

(10) Patent No.: US 7,143,879 B2
(45) Date of Patent: Dec. 5, 2006

(54) TORSIONAL VIBRATION DAMPER

(75) Inventors: Jürgen Ackermann, Schweinfurt (DE);
Peter Frey, Gerolzhofen (DE); Ralf Rönnebeck, Schonungen-Forst (DE);
Christoph Sasse, Schweinfurt (DE);
Erwin Wack, Niederwerrn (DE);
Frank Zerner, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 126 days.

(21) Appl. No.: 10/974,626

(22) Filed: Oct. 27, 2004

(65) Prior Publication Data

US 2005/0115788 A1    Jun. 2, 2005

(30) Foreign Application Priority Data

Oct. 28, 2003 (DE) ................. 103 50 299
Dec. 16, 2003 (DE) ................. 103 58 902

(51) Int. Cl.
*F16H 45/02* (2006.01)

(52) U.S. Cl. ............... 192/3.29; 192/70.17; 192/213.1

(58) Field of Classification Search ............. 192/213.1; 464/68.1, 68.7, 68.8
See application file for complete search history.

(56) References Cited

U.S. PATENT DOCUMENTS

| | | | |
|---|---|---|---|
| 4,523,916 A | 6/1985 | Kizler et al. | |
| 5,575,363 A | 11/1996 | Dehrmann et al. | |
| 5,752,884 A * | 5/1998 | Yabe et al. | 464/68.3 |
| 5,975,261 A | 11/1999 | Woerner et al. | |
| 6,244,401 B1 * | 6/2001 | Maienschein et al. | 192/3.3 |
| 2001/0020563 A1 * | 9/2001 | Sasse et al. | 192/3.28 |
| 2003/0089567 A1 * | 5/2003 | Bauer et al. | 192/3.29 |
| 2003/0178275 A1 * | 9/2003 | Breier et al. | 192/3.29 |
| 2003/0221926 A1 * | 12/2003 | Arhab et al. | 192/3.29 |
| 2004/0226794 A1 * | 11/2004 | Sasse et al. | 192/3.29 |

FOREIGN PATENT DOCUMENTS

| | | |
|---|---|---|
| DE | 32 22 119 C1 | 10/1983 |
| DE | 44 23 640 A1 | 6/1995 |
| DE | 197 24 973 C1 | 10/1998 |
| EP | 1464873 A2 * | 10/2004 |

* cited by examiner

*Primary Examiner*—Richard M. Lorence
(74) *Attorney, Agent, or Firm*—Cohen, Pontani, Lieberman & Pavane (57) ABSTRACT

A torsional vibration damper for a piston-equipped bridging clutch of a hydrodynamic clutch device includes a drive-side transmitting element for at least one damping unit, which is in working connection by way of a transmitting element on the power takeoff-side with a power takeoff component assigned to it, where at least one angle of rotation limiter is assigned to the damping unit. At least one projection is provided on one of the transmitting elements, this projection extending toward the other transmitting element and engaging in an assigned recess in the other transmitting element with predetermined play in the axial direction to form an angle of rotation limiter, where the recess is provided with an appropriate circumferential dimension for the projection to ensure the possibility of a predetermined relative deflection between the two transmitting elements.

20 Claims, 4 Drawing Sheets

TORSIONAL VIBRATION DAMPER

BACKGROUND OF THE INVENTION

1. Field of the Invention

The invention relates to a torsional vibration damper for a piston-equipped bridging clutch of a hydrodynamic clutch device, the torsional vibration damper having a drive-side transmitting element for at least one damping unit, which is in working connection by way of a transmitting element on the power takeoff-side with a power takeoff component assigned to it, an angle of rotation limiter assigned to the damping unit, the angle of rotation limiter having at least one projection extending from one of the transmitting elements toward the other transmitting element, and a recess in the other transmitting element designed to accept the projection, the recess being provided with an appropriate circumferential dimension for the projection to ensure the possibility of a predetermined relative deflection between the two transmitting elements.

2. Description of the Related Art

A torsional vibration damper for a piston-equipped bridging clutch of a hydrodynamic clutch device in the form of a torque converter is known from U.S. Pat. No. 5,975,261. This known torsional vibration damper has a damping unit with elastic energy-storage devices, where a drive-side transmitting element is formed by cover plates which are connected not only to each other but also nonrotatably to the bridging clutch and to a turbine wheel hub. These cover plates cooperate via the energy-storage devices with a hub disk, which acts as a power takeoff-side transmitting element of the torsional vibration damper. The hub disk forms an integral part of a hub, which can be brought into connection with a power takeoff component such as a gearbox input shaft, for example, for rotation in common.

As is especially clear from FIG. 1 of U.S. Pat. No. 5,975,261, the turbine wheel hub has at least one projection which passes through an associated recess in the hub disk, where the projection cooperates with the recess to limit the angle of rotation of the torsional vibration damper.

This method of limiting the angle of rotation fulfills its intended purpose, in that the relative rotational deflection between the drive-side transmitting element and the power takeoff-side transmitting element of the torsional vibration damper is limited in the circumferential direction, but as a result the strength of the hub disk is considerably reduced because of the recesses which pass all the way through in the axial direction.

SUMMARY OF THE INVENTION

An object of the present invention is to provide an angle of rotation-limiting function for a torsional vibration damper such that the strength of the components of the torsional vibration damper are not compromised.

The object is met by a torsional vibration damper for a piston-equipped bridging clutch of a hydrodynamic clutch device, the torsional vibration damper having a drive-side transmitting element for at least one damping unit which is in working connection by way of a power takeoff-side transmitting element with a power takeoff component assigned to it, an angle of rotation limiter assigned to the damping unit, the angle of rotation limiter having at least one projection extending from one of the transmitting elements toward the other transmitting element, and a recess in the other transmitting element designed to accept the projection, the recess being provided with an appropriate circumferential dimension for the projection to allow a predetermined relative deflection between the two transmitting elements. According to the present invention, the transmitting element for the damping unit with the recess is provided on a seating component and is supported on the seating component at least in the area where the recess extends, and the projection engages in the assigned recess with predetermined play in the axial direction with respect to the seating component.

By providing a transmitting element of the damping unit of the torsional vibration damper with at least one projection extending toward the other transmitting element, the transmitting element designed with the projection remains unweakened over its entire cross section. Although the other transmitting element has the recess which accepts the previously mentioned projection, i.e., the recess into which the projection engages in the axial direction, the other transmitting element with the recess is mounted on a seating component, so that the loss of stiffness in this transmitting element caused by the recess is compensated by the ability of the transmitting element to support itself, at least in the area where this recess extends, against the seating component. To this extent, even a recess which passes completely through the transmitting element is noncritical, because the seating component acts as a stabilizer. So that undesirable contact between the projection engaging in the recess and the seating component can be prevented, the projection engages axially in the recess with a predetermined amount of play, where the amount of play is preferably calculated so that the wobbling introduced by a drive unit such as the crankshaft of an internal combustion engine will not cause the seating component and the projection to come into contact with each other when they occupy certain rotational positions relative to each other.

In an embodiment of a hydrodynamic clutch device such as a torque converter or a hydroclutch with a piston-equipped bridging clutch, it is necessary to anticipate relative axial movement between the seating component and the projection in cases where the axially deflectable piston acts as the seating component for the transmitting element which is provided with the recess. In such cases, the predetermined play in the axial direction must therefore be at least equal to the range of movement of the piston, i.e., of the seating component, in this direction. The play in the axial direction between the projection and the recess of the angle of rotation limiter is therefore determined both by the design of the hydrodynamic clutch device and by the intensity of the wobbling introduced by the drive unit.

The transmitting element containing the recesses is preferably provided with a carrier part, which is provided not only with the recesses but also with attachment points between the recesses for the attachment of the transmitting element to the seating component, such as the piston. This ensures that the transmitting element is connected to the seating component at points adjacent to the recesses, which means that the places where the transmitting element is stabilized are as close as possible to the associated recesses. The previously mentioned carrier part of the transmitting element is preferably designed essentially in the form of a ring. This carrier part also allows the transmitting element to perform its basic function with respect to the torsional vibration damper, in that the carrier part provides the driver elements required for the actuation of the energy-storage devices of the damping unit, these driver elements extending essentially in the radial direction from their points of origin on the carrier part.

It is especially preferable for the angle of rotation limiter to be used on a torsional vibration damper in which two damping units, radially offset from each other, are provided, where the energy-storage devices of two damping units are held essentially by a common intermediate cover plate. Because this intermediate cover plate functions as a driver of the energy-storage devices of the two damping units, it assumes the function of an intermediate transmitting element. When the transmitting element with the recess is connected to the piston of the bridging clutch, this transmitting element forms a first, drive-side transmitting element, which actuates the first energy-storage devices, i.e., those coming first in the circumferential direction, of the drive-side damping unit. The opposite ends of these first energy-storage devices are supported on first power takeoff-side driver elements of the intermediate transmitting element, which is also provided with two drive-side driver elements for actuating the energy-storage devices of the power takeoff-side damping unit. The energy-storage devices of this power takeoff-side damping unit are supported in turn on the second power takeoff-side driver elements.

In a design of this type with a drive-side damping unit and a power takeoff-side damping unit, the projection of the angle of rotation limiter is preferably provided on the intermediate transmitting element, so that the projection may engage axially in the recess provided in the drive-side transmitting element with the previously mentioned play. If the energy-storage devices of one of the damping units, such as those of the power takeoff-side damping unit, are to be actuated by an additional cover plate, it is possible to locate the connection by which this cover plate is to be attached to the intermediate transmitting element in the radial area of the first drive-side transmitting element provided with the recess, and to provide the projections of the rotational limiter in the form of pin-like extensions on the connection, especially when this connection is designed as a riveted connection.

If the angle of rotation limiter provided on the intermediate transmitting element acts between the two damping units of the torsional vibration damper, it will limit the relative rotational deflection between the first drive-side transmitting element and the intermediate transmitting element of the drive-side damping unit. To obtain the same effect for the takeoff-side damping unit as well, it is provided according to the claims that an angle of rotation limiter is also provided functionally between the intermediate transmitting element and the second takeoff-side transmitting element. It is especially advantageous for a second connection, preferably in the form of riveting, to pass through assigned openings in a hub disk, which serves as a takeoff side transmitting element, where the goal here again is to use certain elements of the torsional vibration damper, namely, the elements resting against the two radial sides of the opening, to compensate for the possible decrease in the strength of the hub disk caused by the opening, where these elements are, first, the intermediate transmitting element and, second, the cover plate attached to this transmitting element.

In addition, the second connection can also serve another function, namely, that of a driver for a turbine wheel, as a result of which the isolating quality of the torsional vibration damper can be considerably increased, especially when the turbine wheel acts effectively between the two damping units by way of, for example, the base of the turbine wheel shell. This is the case when the turbine wheel is connected, for example, to the second drive-side transmitting element, which, as previously mentioned, can be formed by the intermediate transmitting element and the cover plate.

The hydrodynamic clutch device with the torsional vibration damper according to the invention may have only one friction surface between the converter cover of the converter housing and the piston of the bridging clutch. However, the number of friction surfaces can be increased by installing at least one disk axially between the converter cover and the piston in order to increase the amount of torque which the bridging clutch can transmit. If two or more disks are introduced into the bridging clutch, it is advantageous to interleave intermediate disks axially between them, these intermediate disks being nonrotatable with respect to the converter cover. This nonrotatability can be realized, for example, by attaching an anti-rotation device to the converter cover, where this anti-rotation device is preferably connected nonrotatably to the intermediate disk by a set of teeth. When the bridging clutch is designed, for example, with two disks and one intermediate disk, there will be a total of four friction surfaces, so that this bridging clutch is characterized by a very large torque-transmitting capacity. It is irrelevant here whether the disks are designed with friction linings on both surfaces and the intermediate disk has no friction linings, or whether the disks are designed without friction linings on their sides facing the intermediate disk and the intermediate disk carries friction linings on both sides.

Each of the two disks is preferably connected nonrotatably by a set of teeth to a retaining strap, which in turn is connected nonrotatably to a drive-side transmitting element, which transmits the torque to the torsional vibration damper.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements through the several views.

DETAILED DESCRIPTION OF THE PRESENTLY PREFERRED EMBODIMENTS

Figure 1:
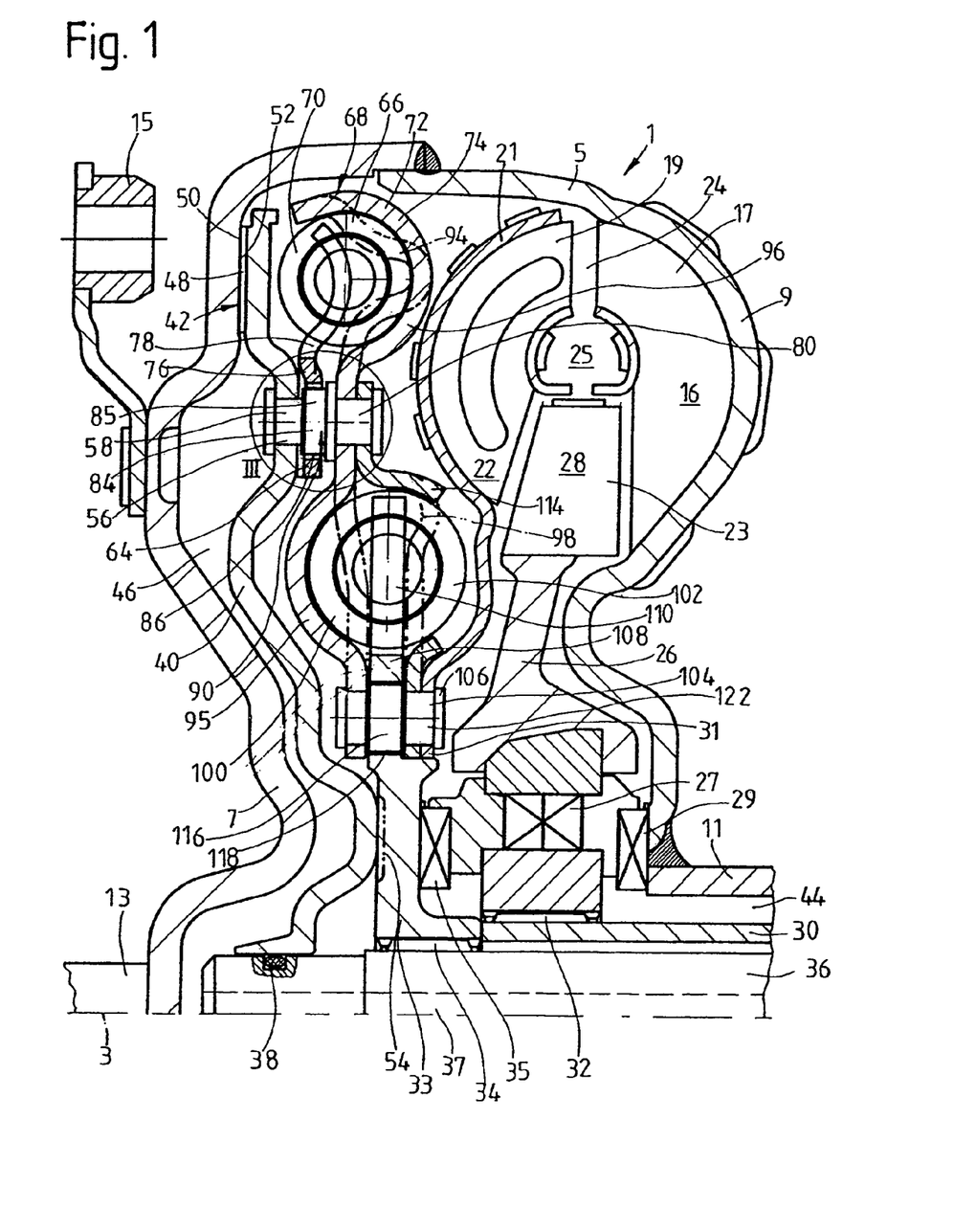
FIG. 1 is a longitudinal sectional view of the upper half of a hydrodynamic torque converter with a bridging clutch, comprising a piston and a torsional vibration damper according to the present invention.

FIG. 1 shows a clutch device 1 in the form of a hydrodynamic torque converter, which is rotatable about an axis of rotation 3. The hydrodynamic clutch device 1 has a converter housing 5 including a converter cover 7 on a side of the converter housing facing a drive unit (not shown), such as an internal combustion engine. The converter cover 7 is permanently connected to a pump wheel shell 9, which is also part of the converter housing 5. A radially inner area of the pump wheel shell 9 merges with a pump wheel hub 11.

The radially inner area of the converter cover 7 has a journal bearing 13, which, in a manner known in itself and therefore not illustrated in detail, is mounted on an element of the drive unit, such as a crankshaft, to center the converter housing 5 on the drive side. The converter cover 7 also has an attachment seat 15, which is used in the conventional manner to attach the converter housing 5 to the drive, preferably by way of a flexplate (not shown). Reference can be made by way of example to FIG. 1 of U.S. Pat. No. 4,523,916 which shows how the journal bearing of a torque converter may be mounted in the crankshaft of a drive unit and how the torque converter may be connected by way of a flexplate to the crankshaft. The entire contents of U.S. Pat. No. 4,523,916 are expressly incorporated herein by reference.

Referring back to FIG. 1 of the present application, the above-mentioned pump wheel shell 9 and pump wheel vanes 16 together form a pump wheel 17 which cooperates with a turbine wheel 19 having a turbine wheel shell 21 and turbine wheel vanes 22, and also with a stator 23. The pump wheel 17, the turbine wheel 19, and the stator 23 form a hydrodynamic circuit 24 which encloses an internal torus 25.

Stator vanes 28 of the stator 23 are provided on a stator hub 26, which is mounted on a freewheel 27. The latter is supported axially by an axial bearing 29 against the pump wheel hub 11 and is connected nonrotatably but with freedom of relative axial movement by a set of teeth 32 to a support shaft 30, which is radially inside the pump wheel hub 11. The support shaft 30 and the pump wheel hub 11 form the radial boundaries of a ring-shaped supply channel 44. The support shaft 30, which is hollow, encloses a takeoff component 36 in the form of a gearbox input shaft, which is provided with a central bore 37 for the passage of hydraulic fluid. A set of teeth 34 on the takeoff component 36 are in meshed engagement with the turbine wheel hub so that the turbine wheel hub 33 rotates along with the takeoff component 36 and has a certain freedom of axial movement relative to the takeoff component 36. A radially outer area of the turbine wheel hub 33 holds a turbine wheel base 31. The turbine wheel hub 33 is supported on one side by an axial bearing 35 against the previously mentioned freewheel 27 and on the other side rests against a piston 40 of a bridging clutch 42. The radially inner side of the piston 40 is sealed off from the takeoff component 36 by a seal 38.

The hydrodynamic circuit 24 is supplied with fluid through the ring-shaped supply channel 44 and channels through the axial bearings 29 and/or 35. The channels through the axial bearings are of conventional design and are therefore not illustrated. The central bore 37 in the takeoff component 36 is used to introduce pressure to the piston 40, for which purpose a connection with a control device and a hydrodynamic fluid reservoir are required. Neither the control device nor the hydraulic fluid reservoir is shown in the drawing, but they can be seen in FIG. 1 of U.S. Pat. No. 5,623,061, the contents of which are expressly incorporated herein by reference.

Hydraulic fluid which has entered via the central bore 37 of the takeoff component 36 proceeds radially outward into a chamber 46 located axially between the converter cover 7 and the piston 40. This piston 40 is centered with respect to the converter cover 7, and the side which faces away from the chamber 46 faces the hydrodynamic circuit 24 and can be moved as a function of the pressure relationships in the hydrodynamic circuit 24 and in the chamber 46 between two different axial limit positions, which will be discussed in greater detail below.

The outer radial area of the piston 40 carries a friction lining 48 on the side facing the converter cover 7. The lining 48 passes around the axis of rotation 3 in a ring-like manner. On a side of the lining 48 facing away from the piston 40, which side is to be called the friction area 50 in the following, the lining 48 may be brought into friction-locking contact with an opposing friction area 52 on the converter cover 7 when the pressure in the hydrodynamic circuit 24 is greater than the pressure in the chamber 46 on the opposite side of the piston 40.

The first of the previously mentioned axial limit positions of the piston 40 is reached when the friction area 50 of the friction lining 48 arrives in friction-locking connection with the opposing friction area 52. The second axial limit position is reached when the pressure in the chamber 46 is greater than that in the hydrodynamic circuit 24 and the piston 40 is therefore shifted axially until it comes to rest against a stop 54 on the turbine wheel hub 33.

Figure 2:
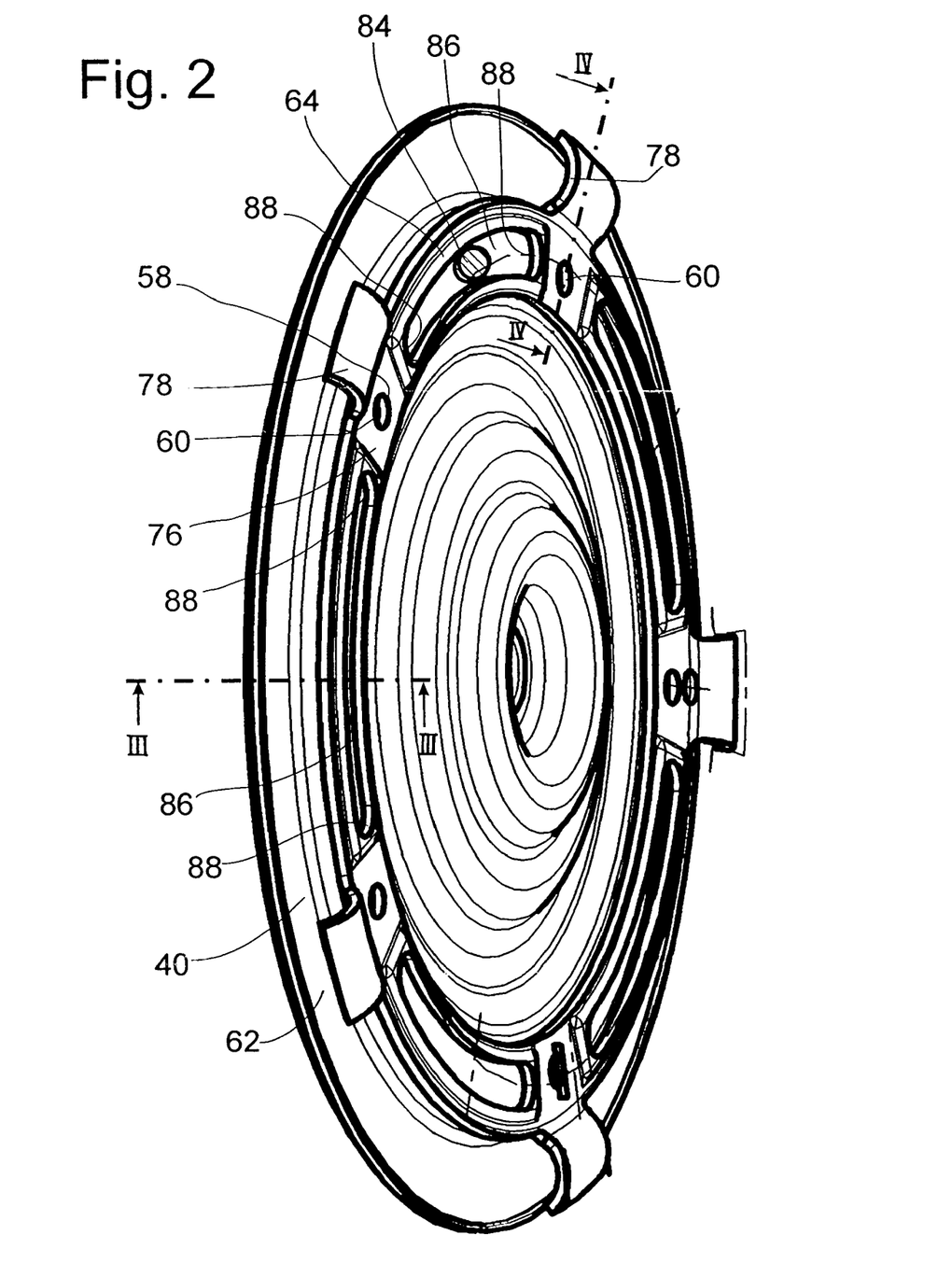
FIG. 2 is a perspective view of part of the piston of the bridging clutch and of part of a first drive-side transmitting element of the torsional vibration damper.
Figure 4:
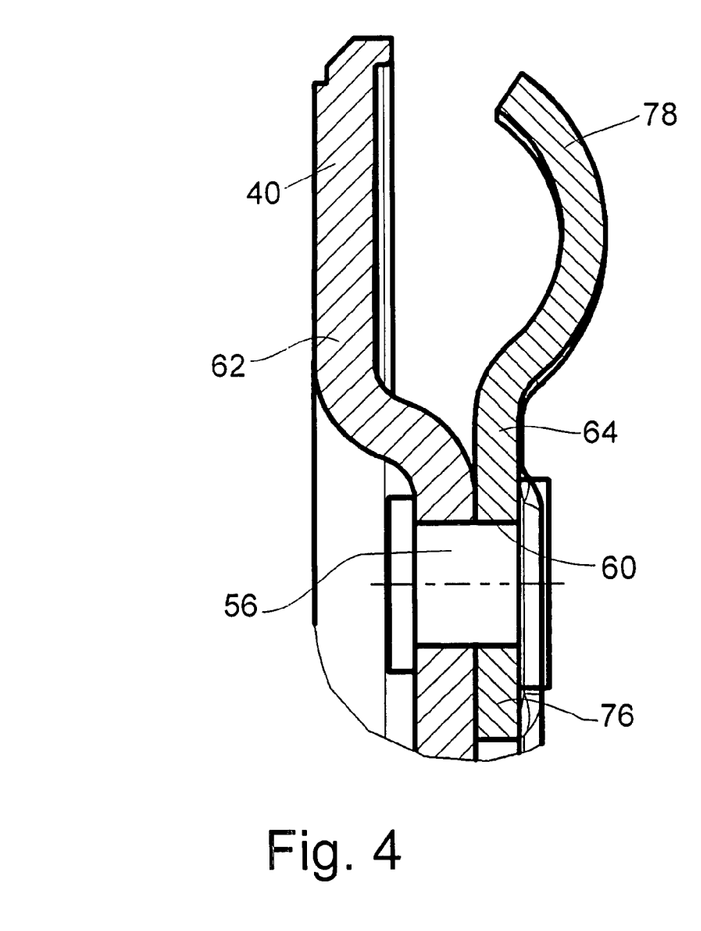
FIG. 4 is a cross-sectional view of the bridging clutch and of the first drive-side transmitting element of the torsional vibration damper cut along the line IV—IV in FIG. 2.

FIG. 1 also shows a torsional vibration damper 68, which, like the piston 40, is part of the bridging clutch 42 of the hydrodynamic torque converter 10. Referring now also to FIGS. 2 and 4, the torsional vibration damper 68 has a first drive-side transmitting element 64 which has a carrier part 76. Fastening means 56 are used to attach the carrier part 76 of the transmitting element 64 to the piston 40. Thus the piston 40 serves as a seating component 62 for the first drive-side transmitting element 64.

As FIG. 2 shows, the carrier part 76 of the first drive-side transmitting element 64 is essentially ring-shaped and has a plurality of openings 60, which are offset from each other by predetermined circumferential distances and through which the fastening means 56 pass (see FIG. 4). There is a recess 86 circumferentially between each pair of attachment points 58, and each pair of recesses 86 has an attachment point 58 between them. Each of these recesses 86 is designed with essentially semicircular circumferential ends 88.

A first drive-side driver element 78 is provided on the first drive-side transmitting element 64 radially outside each of the attachment points 58. The first driver elements 78 are able to actuate first energy-storage devices 70 (see FIG. 1) of a radially outer drive-side damping unit 66. The first energy-storage devices 70 are supported at their other ends against a first power takeoff-side driver element 94 of an intermediate cover plate 74, which surrounds at least part of the circumference of the first energy-storage devices 70. Radially inside the first energy-storage devices 70, a cover plate 114 is attached to the intermediate cover plate 74 by a first connection 80 which is preferably realized by rivets 82. This connection 80 is shown on a magnified scale in FIG. 3. It can therefore be seen that, on the side of the connection 80 facing the piston 40, a projection 84 is provided, which, in the form of a pin-like extension 85 formed on the rivet 82, engages in the previously described recess 86 in the first drive-side transmitting element 64. The radial play shown in FIG. 3 between the recess 86 and the projection 84 is exaggerated for the sake of clarity. It is essential, however, that the projection 84 be able to perform relative movement in the recess 86 in the circumferential direction. To ensure that a predetermined relative deflection between the first drive-side transmitting element 64 and the intermediate cover plate 74 is possible, the recess 86 is designed with a corresponding circumferential dimension for the projection 84. FIG. 2 shows by way of example a cross-sectional view of a projection 84 in one of the recesses 86. It can be seen that the previously mentioned circumferential ends 88 of the recesses 86 conform geometrically to the outside contour of the projection 84. The projection 84 on the intermediate cover plate 74 and the recess 86 in the first drive-side transmitting element 64 serve in common as components of a first angle of rotation limiter 90 between the drive side and the takeoff side of the drive-side damping unit 66.

Figure 3:
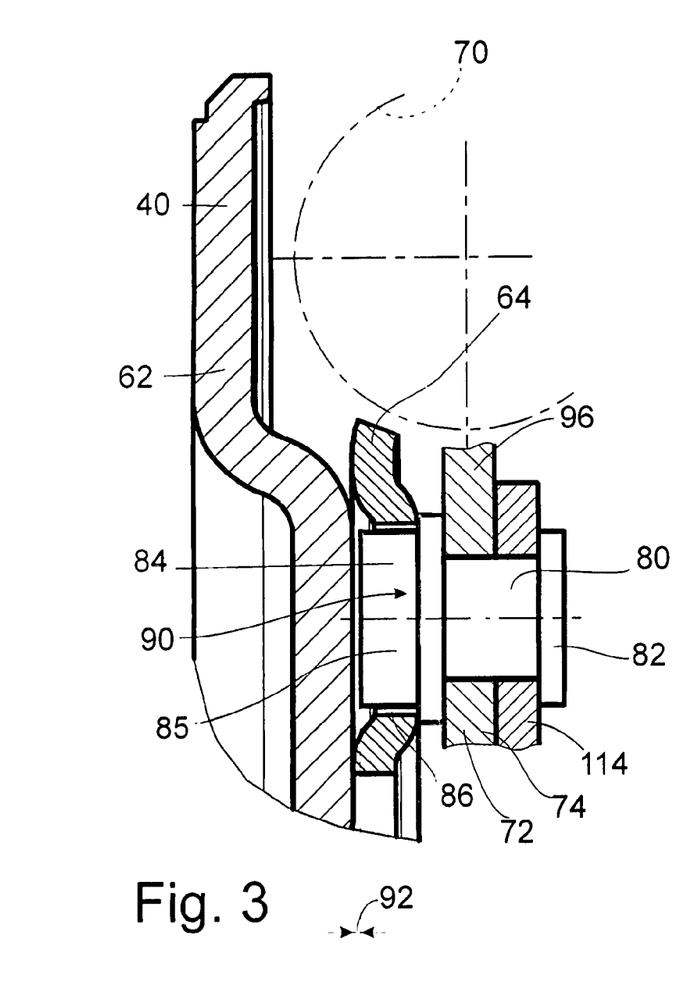
FIG. 3 is a magnified sectional view of the circled area marked III in FIG. 1, which has been cut along the line III—III in FIG. 2.

While the previously mentioned intermediate cover plate 74 is mounted in an essentially permanent axial position in the hydrodynamic clutch device 1, the first drive-side transmitting element 64, because of its attachment to the piston 40, will copy the axial movement of the piston, so that the play 92 in the axial direction shown in FIG. 3 must correspond at least to the deflection of the piston 40 in this direction and may possibly also take into account any wobbling movements introduced via the converter housing 5 to the piston 40.

Radially inside the first connection 80, the intermediate cover plate 74 surrounds the second energy-storage devices 102 of the radially inner takeoff-side damping unit 100, at least around part of the circumference thereof. The cover plate 114, which is attached by the first connection 80 to the intermediate cover plate 74, also surrounds the second energy-storage devices 102. With respect to the power takeoff-side damping unit 100, therefore, the intermediate cover plate 74 and the cover plate 114 serve as a second drive-side transmitting element 95, which actuates the second energy-storage devices 102 by means of second drive-side driver elements 98. The other end of the second energy-storage devices 102 is supported on the second power takeoff-side driver elements 110, which are provided on a hub disk 108, which is part of the previously mentioned turbine wheel hub 33.

Through the function of the intermediate cover plate 74 both as a first power takeoff-side transmitting element 72 and as a second drive-side transmitting element 95, this intermediate cover plate 74 acts as an intermediate transmitting element 96 of the torsional vibration damper 68. The cover plate 114 and the intermediate transmitting element 96 are connected to each other radially inside the second energy-storage devices 102 by a second connection 104 in the form of rivets 106, where the second connection 104 passes axially through a recess 118 in the hub disk 108. The recess 118 is designed with an appropriate circumferential dimension for the second connection 104 to ensure the possibility of a predetermined relative deflection between the intermediate transmitting element 96 plus the cover plate 114 and the hub disk 108. The second connection 104 and the recess 118 thus act together as a second angle of rotation limiter 116. This second angle of rotation limiter 116 is assigned to the power takeoff-side damping unit 100.

The second connection 104 also serves as a driver 122 for a turbine wheel base 31 on the radially inner side on the turbine wheel shell 21, so that the turbine wheel 19 is also deflected as mass when the intermediate transmitting element 96 and the cover plate 114 are deflected. As a result of this measure, i.e., the incorporation of the turbine wheel 19 as mass effectively between the two damping units 66 and 100 of the torsional vibration damper 68, the action of the latter is advantageously improved.

Figure 5:
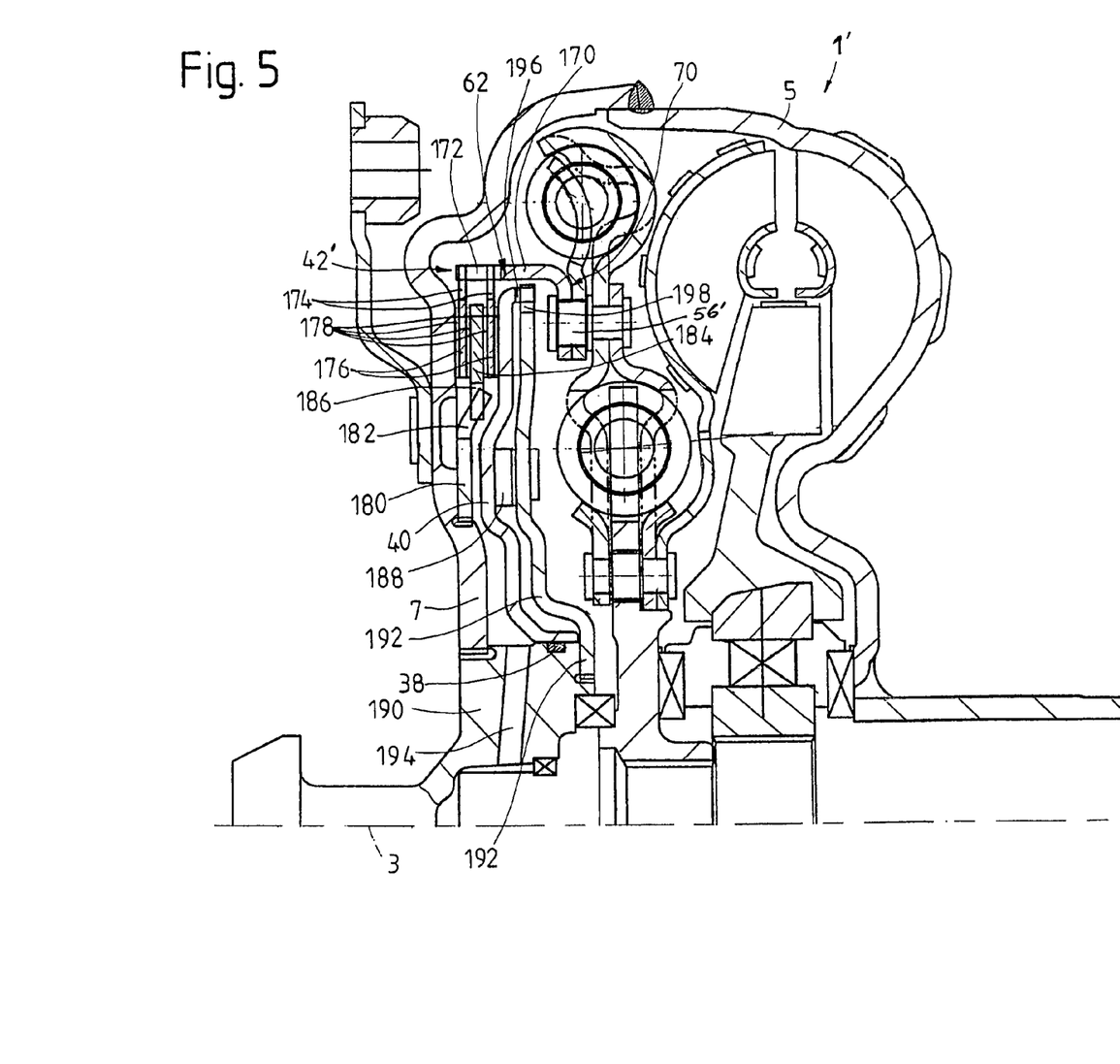
FIG. 5 is a longitudinal sectional view of the upper half of a hydrodynamic torque converter with a bridging clutch having plural friction disks.

FIG. 5 shows a hydrodynamic clutch device 1' which differs from that of FIG. 1 essentially with respect to the design of the bridging clutch 42'. The bridging clutch 42' of FIG. 5 has two disks 176 axially between a converter cover 7 of the converter housing 5 and the piston 40. The radially outer areas of these disks carry sets of teeth 174 which engage nonrotatably but with freedom of axial movement with a set of teeth 172 on a retaining strap 170, which is mounted by way of an attachment point 56' nonrotatably on the first drive-side transmitting element 64.

Each of the two disks 176 carries a friction lining 178 on both axial sides. An intermediate disk 184 is inserted axially between the two facing friction linings 178. The radially inner side of the intermediate disk has a set of teeth 186, which engage a set of teeth 182 on an antirotation device 180, which is mounted nonrotatably on the converter cover 7. The sets of teeth 182, 186 thus connect the intermediate disk 184 nonrotatably to the converter housing 5. The disks 176, because of their connection with the first drive-side transmitting element 64, are able to move with respect to the converter housing 5.

Regardless of whether the friction linings 178 are attached to the disks 176 and the intermediate disk 184 is free of friction linings, as previously described, or whether the intermediate disk 184 carries friction linings 178 on both sides and the adjacent disks 176 are free of friction linings on their corresponding axial sides, what is obtained as a result of the design of the bridging clutch 42' according to FIG. 5 is a system with four friction surfaces, so that much higher torques can be transmitted than in the case according to FIG. 1, in which there is only one friction surface.

The piston 40 is mounted with freedom of rotation on a housing hub 190, which has a flow channel 194, which produces a flow connection between the central bore 37 of the takeoff component 36 and the chamber 46. The piston 40 is mounted by its base on a seal 38 and is attached by tangential leaf springs 188 to a holding device 192, which is attached nonrotatably to the housing hub 190. An antirotation device for the piston 40 is formed by a set of teeth 196 on the outer circumference. The teeth 196 connect the piston nonrotatably but with freedom of axial movement to a set of teeth 198 on the outer circumference of the holding device 192.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A torsional vibration damper for a bridge clutch in a hydrodynamic clutch device, the bridge clutch having a piston axially movable between predetermined axial limit positions defining a maximum axial deflection of the piston, said torsional vibration damper comprising:

at least one damping unit comprising a drive-side transmitting element and a power takeoff side transmitting element;

an angle of rotation limiter for said at least one damping unit including a projection extending from one of said drive-side transmitting element and said power takeoff-side transmitting element, the other one of said drive-side transmitting element and said power takeoff-side transmitting element defining a recess in at least a first area thereof, the recess being arranged and dimensioned for accepting said projection and having a circumferential dimension allowing a predetermined relative deflection between said drive-side transmitting element and said power takeoff-side transmitting element; and a seating component, at least a second area of said other one of said drive-side transmitting element and said power takeoff-side transmitting element being supported on and attached to said seating component, said projection engaging said recess with a predetermined axial play relative to said seating component, said predetermined axial play corresponding to at least said maximum axial deflection of the piston.

2. The torsional vibration damper of claim 1, wherein said projection comprises a cross-sectional form and said recess includes circumferential ends which conform geometrically to the cross-sectional form of said projection.

3. The torsional vibration damper of claim 2, wherein said projection is a pin, and the circumferential ends of said recess are approximately semicircular.

4. The torsional vibration damper of claim 1, wherein said at least one damping unit comprises at least one energy storage device, and said other one of said drive-side transmitting element and said power takeoff-side transmitting element includes a carrier part defining said recess and at least one driver element arranged on the carrier part for interacting with said energy-storage devices of the damping unit.

5. The torsional vibration damper of claim 4, wherein said carrier part of said other one of said drive-side transmitting element and said power takeoff side transmitting element defines a plurality of said recesses and has attachment points arranged circumferentially between said recesses for attaching said other one of said drive-side transmitting element and said power takeoff side transmitting element to said seating component.

6. The torsional vibration damper of claim 4, wherein said carrier part of said other one of said drive-side transmitting element and said power takeoff side transmitting element is ring-shaped.

7. The torsional vibration damper of claim 4, wherein said at least one driver element projects approximately radially with respect to said carrier part.

8. The torsional vibration damper of claim 4, further comprising the piston, wherein said seating component for said carrier part is the piston and said carrier part is fixed with respect to rotation relative to said piston by fastening devices which pass through openings at attachment points of the other one of said drive-side transmitting element and said power takeoff-side transmitting element.

9. The torsional vibration damper of claim 1, wherein said at least one damping unit comprises a drive-side damping unit and a power takeoff-side damping unit, said drive-side damping unit having first energy-storage devices, a first drive-side transmitting element actuating said first energy storage device in the circumferential direction at one end of said first energy storage devices, and an intermediate transmitting element comprising a first power takeoff-side driver element supporting the opposite ends of said first energy storage devices, said projection of said angle of rotation limiter being connected to said intermediate transmitting element, and wherein said intermediate transmitting element further comprises a second drive-side driver element arranged for exerting force on second energy-storage devices of said power takeoff-side damping unit.

10. The torsional vibration damper of claim 9, further comprising a cover plate connected to said intermediate transmitting element by a first connection to form a second drive-side transmitting element for said power takeoff-side damping unit, said first connection carrying said projection of said angle of rotation limiter, said projection being a pin-like extension on a side of said intermediate transmitting element facing said drive-side transmitting element of said drive-side damping unit.

11. The torsional vibration damper of claim 10, wherein said second drive-side transmitting element and said cover plate are attached to each other radially inside said power takeoff-side damping unit by a second connection, said second power takeoff-side transmitting element defining a second recess through which said second connection extends, thereby forming a second angle of rotation limiter, wherein said second recess is dimensioned allowing a predetermined relative deflection between said second drive-side transmitting element and said second power takeoff-side transmitting element.

12. The torsional vibration damper of claim 11, wherein said second power takeoff-side transmitting element is connected to a turbine wheel hub of the hydrodynamic clutch device so that said second power takeoff-side transmitting element is fixed with respect to rotation to the turbine wheel hub, said second connection comprising a driver located between the drive-side and the power takeoff-side damping units providing a nonrotatable connection of the torsional vibration damper to a turbine wheel shell of a turbine wheel of the hydrodynamic clutch device.

13. The torsional vibration damper of claim 10, wherein at least one of said first and second connections is a riveted connection.

14. The torsional vibration damper of claim 1, wherein said seating component for said other one of said drive-side transmitting element and said power takeoff-side transmitting element is a retaining strap connected nonrotatably to at least one disk located axially between the piston of the bridging clutch and a converter cover of the hydrodynamic clutch.

15. The torsional vibration damper of claim 14, wherein said retaining strap comprises a set of teeth in meshed engagement with a further set of teeth of said at least one disk such that said at least one disk is fixed with respect to rotation and is axially moveable relative to said retaining strap.

16. The torsional vibration damper of claim 14, wherein at least one axial side of said at least one disk comprises a friction lining.

17. The torsional vibration damper of claim 14, wherein said retaining strap is in meshed engagement with sets of teeth of at least two disks such that said retaining strap is fixed with respect to rotation and axially moveable relative to said at least two disks, said torsional vibration damper further comprising an intermediate disk arranged axially between each pair of said at least two disks, said intermediate disk having a set of teeth in meshed engagement with a set of teeth on an anti-rotation device.

18. The torsional vibration damper of claim 17, wherein said anti-rotation device is fixed with respect to rotation relative to the converter cover.

19. The torsional vibration damper of claim 1, wherein said drive side transmitting element and said power take off side transmitting element are arranged and dimensioned such that they are axially movable relative to each other relative to an axial deflection of the piston.

20. A torsional vibration damper for a bridge clutch in a hydrodynamic clutch device, the bridge clutch having a piston, said torsional vibration damper comprising:
- at least one damping unit comprising a drive-side transmitting element, a power takeoff side transmitting element, and at least one energy storage device;
- an angle of rotation limiter for said at least one damping unit including a projection extending from one of said drive-side transmitting element and said power takeoff-side transmitting element, the other one of said drive-side transmitting element and said power takeoff-side transmitting element with a carrier part defining a recess arranged and dimensioned for accepting said projection and having a circumferential dimension allowing a predetermined relative deflection between said drive-side transmitting element and said power takeoff-side transmitting element;
- at least one driver element arranged on said carrier part for interacting with said energy-storage devices of said damping unit; and
- a seating component, at least an area of said carrier part of said other one of said drive-side transmitting element and said power takeoff-side transmitting element in which said recess extends being supported on said seating component, said projection engaging said recess with a predetermined axial play relative to said seating component;
- wherein said seating component for said carrier part is the piston and said carrier part is fixed with respect to rotation relative to said piston by fastening devices which pass through openings at attachment points of the other one of said drive-side transmitting element and said power takeoff-side transmitting element.

* * * * *